United States Patent
Kumar et al.

(10) Patent No.: US 9,548,518 B2
(45) Date of Patent: Jan. 17, 2017

(54) METHODS FOR JOINING CERAMIC AND METALLIC STRUCTURES

(71) Applicant: GENERAL ELECTRIC COMPANY, Schnectady, NY (US)

(72) Inventors: Sundeep Kumar, Bangalore (IN); Eklavya Calla, Bangalore (IN); Mohamed Rahmane, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 5 days.

(21) Appl. No.: 14/572,216

(22) Filed: Dec. 16, 2014

(65) Prior Publication Data

US 2016/0172713 A1    Jun. 16, 2016

(51) Int. Cl.
| | |
|---|---|
| *B23K 31/02* | (2006.01) |
| *H01M 10/38* | (2006.01) |
| *B23K 1/00* | (2006.01) |
| *B23K 1/20* | (2006.01) |
| *B23K 35/24* | (2006.01) |

(Continued)

(52) U.S. Cl.
CPC ............ *H01M 10/38* (2013.01); *B23K 1/0016* (2013.01); *B23K 1/19* (2013.01); *B23K 1/20* (2013.01); *B23K 35/24* (2013.01); *H01M 10/399* (2013.01); *B23K 2201/36* (2013.01); *B23K 2203/02* (2013.01); *B23K 2203/04* (2013.01); *B23K 2203/05* (2015.10); *B23K 2203/08* (2013.01); *B23K 2203/18* (2013.01);

(Continued)

(58) Field of Classification Search
None
See application file for complete search history.

(56) References Cited

U.S. PATENT DOCUMENTS

| | | | |
|---|---|---|---|
| 2,722,496 A | 11/1955 | Hosmer | |
| 4,763,828 A * | 8/1988 | Fukaya | C04B 37/026 228/124.1 |

(Continued)

FOREIGN PATENT DOCUMENTS

| | | | |
|---|---|---|---|
| EP | 0922682 A1 | 6/1999 | |
| EP | 2666582 A1 * | 11/2013 | |

(Continued)

OTHER PUBLICATIONS

Laik et al., "On characterisation of wire-arc-plasma-sprayed Ni on alumina substrate", Materials Characterization, ScienceDirect, Aug. 2005, pp. 118-126, vol. 55, Issue 2.

(Continued)

*Primary Examiner* — Kiley Stoner
(74) *Attorney, Agent, or Firm* — Francis T. Coppa

(57) ABSTRACT

A method for joining a ceramic component to a metallic component is described. At least one initial layer of an active metal is applied to one of the joining surfaces, by a cold spray technique. At least one second layer of a nickel-based braze composition is then applied over the initial layer by cold-spraying. The braze composition and components are then heated, so as to form an active braze joint between them. A method of sealing an open region of a sodium metal halide-based battery is also disclosed, using the brazing technique described herein to form braze joints that seal various components in the battery cells, such as metallic rings and ceramic collar structures.

11 Claims, 2 Drawing Sheets

(51) Int. Cl.
*H01M 10/39* (2006.01)
*B23K 1/19* (2006.01)

(52) U.S. Cl.
CPC ...... *B23K 2203/26* (2015.10); *B23K 2203/52* (2015.10); *H01M 2300/0054* (2013.01)

(56) References Cited

U.S. PATENT DOCUMENTS

| | | | | |
|---|---|---|---|---|
| 6,106,960 | A * | 8/2000 | Fujii | C04B 37/006 228/124.5 |
| 6,344,237 | B1 | 2/2002 | Kilmer et al. | |
| 6,528,123 | B1 | 3/2003 | Cadden et al. | |
| 8,220,695 | B1 * | 7/2012 | Wei | B23K 1/0008 228/122.1 |
| 8,563,142 | B2 * | 10/2013 | Bossmann | B23K 1/0018 228/122.1 |
| 8,757,471 | B2 | 6/2014 | Kumar et al. | |
| 2004/0126612 | A1 * | 7/2004 | Shinkai | C04B 37/026 428/627 |
| 2004/0262367 | A1 * | 12/2004 | Nakamura | H01L 23/3735 228/122.1 |
| 2005/0233066 | A1 * | 10/2005 | Sunagawa | C23C 24/04 427/58 |
| 2006/0121306 | A1 | 6/2006 | Wijenberg et al. | |
| 2006/0166020 | A1 * | 7/2006 | Raybould | C23C 24/04 428/471 |
| 2007/0003829 | A1 * | 1/2007 | Imachi | H01M 2/1653 429/152 |
| 2007/0153965 | A1 * | 7/2007 | Choi | C23C 4/06 376/417 |
| 2007/0215677 | A1 * | 9/2007 | Floyd | B23K 1/008 228/122.1 |
| 2007/0248750 | A1 * | 10/2007 | Allen | B23P 6/007 427/180 |
| 2008/0271779 | A1 * | 11/2008 | Miller | B22F 1/0014 136/252 |
| 2009/0186195 | A1 | 7/2009 | Spraker et al. | |
| 2010/0304095 | A1 * | 12/2010 | Valls Angles | B21D 37/01 428/188 |
| 2011/0003165 | A1 * | 1/2011 | Weber | C23C 4/02 428/551 |
| 2011/0244303 | A1 | 10/2011 | Rahmane et al. | |
| 2012/0055256 | A1 * | 3/2012 | Drewes | G01L 9/0042 73/753 |
| 2012/0063911 | A1 * | 3/2012 | Bossmann | B23K 1/0018 416/241 B |
| 2012/0069524 | A1 * | 3/2012 | Schulz-Harder | H01L 23/3735 361/716 |
| 2013/0153089 | A1 | 6/2013 | Ajdelsztajn et al. | |
| 2013/0162278 | A1 * | 6/2013 | Chung | B23K 1/0008 324/755.01 |
| 2013/0177437 | A1 | 7/2013 | Amancherla et al. | |
| 2013/0236738 | A1 * | 9/2013 | Yamauchi | C04B 41/009 428/632 |
| 2013/0292816 | A1 * | 11/2013 | Otaki | B32B 15/01 257/706 |
| 2014/0033523 | A1 * | 2/2014 | Rakozy | B23K 1/0016 29/825 |
| 2014/0356681 | A1 * | 12/2014 | Kumar | H01M 10/399 429/104 |
| 2014/0356701 | A1 * | 12/2014 | Gong | H01M 2/08 429/185 |
| 2015/0132602 | A1 * | 5/2015 | Sun | C23C 24/04 428/651 |
| 2015/0188195 | A1 * | 7/2015 | Matsushita | H01M 10/0585 429/152 |
| 2015/0216056 | A1 * | 7/2015 | Teshima | C23F 1/30 428/552 |
| 2015/0267732 | A1 * | 9/2015 | Williamson | B05D 1/12 403/343 |
| 2015/0287505 | A1 * | 10/2015 | Jung | H01C 17/02 338/272 |

FOREIGN PATENT DOCUMENTS

| | | | |
|---|---|---|---|
| JP | 62104696 A | * | 5/1987 |
| JP | 09030870 A | * | 4/1997 |

OTHER PUBLICATIONS

J. Intratera., "Review of some processes for ceramic-to-metal joining", Materials and Manufacturing Processes, Tayloy & Francis online, 1993, pp. 353-373, vol. 8, Issue 3.

Raghavendra Rao Adharapurapu et al, "Braze Compositions, and Related Articles and Methods", U.S. Appl. No. 13/407,870, filed Feb. 29, 2012, pp. 1-20.

Raghavendra Rao Adharapurapu et al., "Braze Compositions, and Related Devices", U.S. Appl. No. 13/538,203, filed Jun. 29, 2012, pp. 1-19.

Raghavendra Rao Adharapurapu et al., "Braze Compositions, and Related Devices", U.S. Appl. No. 13/600,333, filed Aug. 31, 2012, pp. 1-23.

Sundeep Kumar et al., "Metallic Compositions Useful for Brazing, and Related Processes and Devices", U.S. Appl. No. 13/628,548, filed Sep. 27, 2012, pp. 1-22.

Ronald Scott Bunker et al., "Methods for the Formation of Cooling Channels, and Related Articles of Manufacture", U.S. Appl. No. 14/087,897, filed Nov. 22, 2013, pp. 1-18.

* cited by examiner

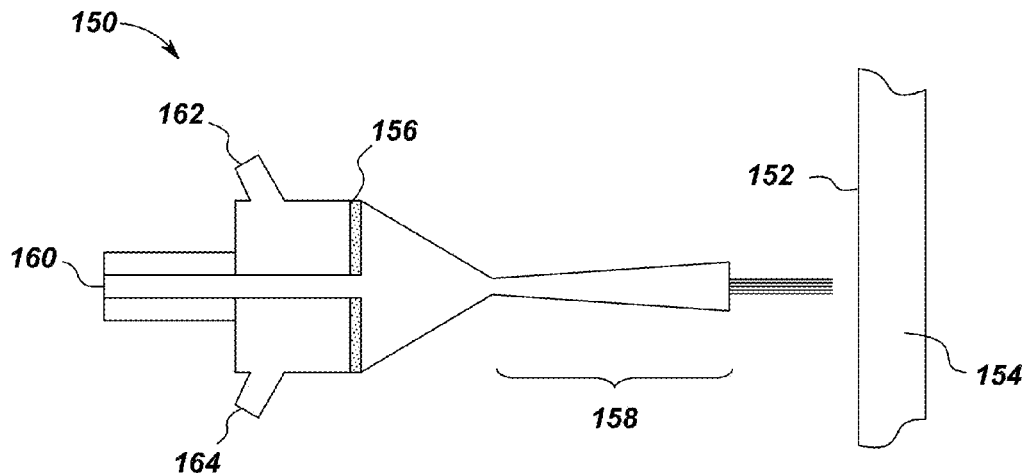
Fig. 2
L1 ⟶ L2 ⟶ L3 ⟶ L4 ⟶ Braze
Ti      Cr      Ni      Si/B
Fig. 3
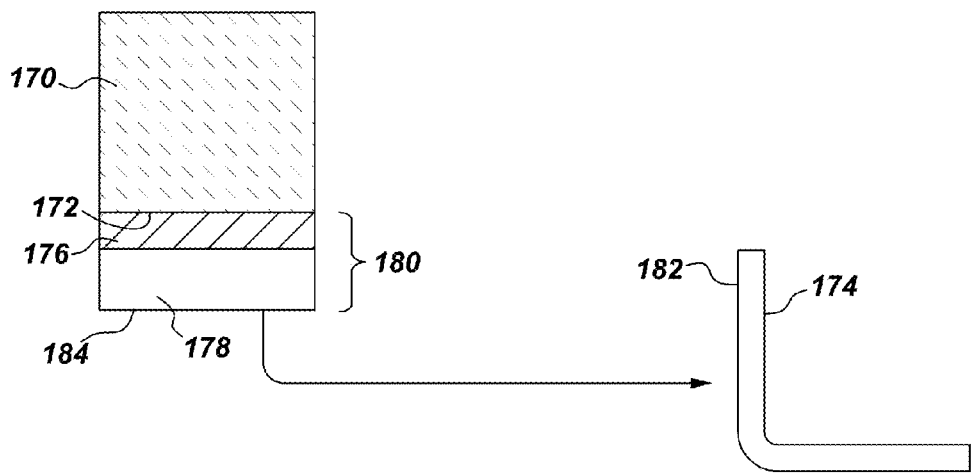
Fig. 4

METHODS FOR JOINING CERAMIC AND METALLIC STRUCTURES

TECHNICAL FIELD

This disclosure relates to electrochemical devices, such as batteries. In some particular embodiments, the invention relates to metallization and sealing techniques on which the devices are based.

BACKGROUND OF THE INVENTION

A variety of electrochemical devices require processes and compositions for providing seals on or within the devices. The seals may be used to encapsulate the entire device, or they may separate various chambers within the device. As an example, many types of seal materials have been considered for use in high-temperature rechargeable batteries/cells for joining different components.

Sodium/sulfur or sodium/metal halide are good examples of high-temperature batteries that may include a variety of ceramic and metal components. The ceramic components often include an electrically insulating alpha-alumina collar, and an ion-conductive electrolyte beta-alumina tube, and are generally joined or bonded via a sealing glass. The metal components usually include a metallic casing, current collector components, and other metallic components which are often joined by welding or thermal compression bonding (TCB). While mechanisms for sealing these components are currently available, their use can sometimes present some difficulty. For example, metal-to-ceramic bonding can be challenging, due to thermal stress caused by a mismatch in the coefficient of thermal expansion for the ceramic and metal components.

Since metal-to ceramic bonding is most critical for the reliability and safety of the cells for high-temperature batteries, many different types of seal materials and sealing processes have been considered for joining such components, including ceramic adhesives, brazing, and sintering. However, most of the seals may not withstand high temperatures and corrosive environments. A common bonding technique involves multiple steps of metalizing the ceramic component, followed by bonding the metallized ceramic component to the metal component using thermal compression bonding (TCB).

The bond strength of such metal-to-ceramic joints is controlled by a wide range of variables, such as the microstructure of the ceramic component, the metallization of the ceramic component, and various TCB process parameters. In order to ensure good bond strength, the process requires close control of several parameters involved in various process steps. In short, the method is relatively expensive, and complicated, in view of the multiple processing steps, and the difficulty in controlling the processing steps.

In some instances, metallization of a ceramic surface for bonding with a metal component involves the use of molybdenum or molybdenum/manganese-based inks, as described in "Zebra Electric Energy Storage system: From R&D to Market", Renato Manzoni et al, HTE hi.tech.expo—Milan 25-28 Nov. 2008 (website record). In a typical process, the ink or paste is formulated with various alcohols, amines, and alkanes, along with binder materials. (Various other components may also be present, e.g., ether esters, aromatic compounds, and functionalized silanes). The inks are often screen-printed on top of the ceramic, effectively metallizing the component. The ceramic can then be clamped to an appropriate metal component, e.g., a nickel ring for a battery cell, followed by heating in a kiln or other suitable furnace to join the parts by a TCB technique.

While the use of the molybdenum inks can be useful in some types of metallization applications, they can also present various disadvantages. For example, some of the binder materials present in the inks may remain in the composition, even after high-temperature brazing. The binder residue can hinder the brazing process, and decrease the strength of the overall braze joint. In the case of assembling sodium nickel halide cells, the residue can also adversely affect the reaction chemistry for the cells, if contact is made with the reaction components. Moreover, the ink processes will still usually be part of a TCB process, with its attendant disadvantages, as noted previously.

With these considerations in mind, new types of sealing structures and compositions for energy storage devices and other types of electrochemical cells would be welcome in the art. The new technology should provide hermetic sealing with a joint strength sufficient to meet rigorous end use requirements for the cell. Moreover, the overall sealing structure should be compatible with electrochemical cell contents that might come into contact with the seals. It would also be desirable if the sealing structures can be obtained with relatively low fabrication costs, e.g., as compared to some of the metallization/TCB processes used in conventional situations.

BRIEF DESCRIPTION OF THE INVENTION

One embodiment of the invention is directed to a method for joining a ceramic component to a metallic component, comprising the following steps:

a) applying at least one initial layer of an active metal onto one of the joining surfaces by a cold spray technique;

b) applying at least one second layer of a nickel-based braze composition over the initial layer by the cold spray technique; and c) heating the components and the braze composition while the components are in contact with each other, so as to form an active braze joint between them.

Another embodiment relates to a method of sealing an open region of a sodium metal halide-based battery that includes (a) an anodic chamber for containing an anodic material; and a cathodic chamber for containing a cathodic material, separated from each other by an electrolyte separator tube, all contained within a case for the cell;

(b) an electrically insulating ceramic collar positioned at or near an opening of the cathodic chamber, and defining an aperture in communication with the opening; and (c) a cathode current collector assembly disposed within the cathode chamber.

The method comprises the steps of (i) inserting at least one metal ring between at least a portion of the cathode current collector assembly and an adjacent portion of the ceramic collar;

(ii) applying at least one initial layer of an active metal onto at least part of the surface of the ceramic collar portion, by a cold spray technique;

(iii) applying at least one second layer of a nickel-based braze composition over the active metal layer by the cold spray technique; and (iv) heating the braze composition to a sufficient brazing temperature, so as to provide, upon cooling, a hermetic seal between the metal ring, the current collector assembly, and the adjacent portion of the ceramic collar.

BRIEF DESCRIPTION OF DRAWINGS

FIG. 2 is a simplified illustration of a cold spray system.

FIG. 3 is a depiction of an illustrative sequence for cold spraying braze material layers, according to some embodiments.

FIG. 4 is a simplified illustration of a braze-based joining process for ceramic and metal components that require attachment to each other.

DETAILED DESCRIPTION OF THE INVENTION

Figure 1:
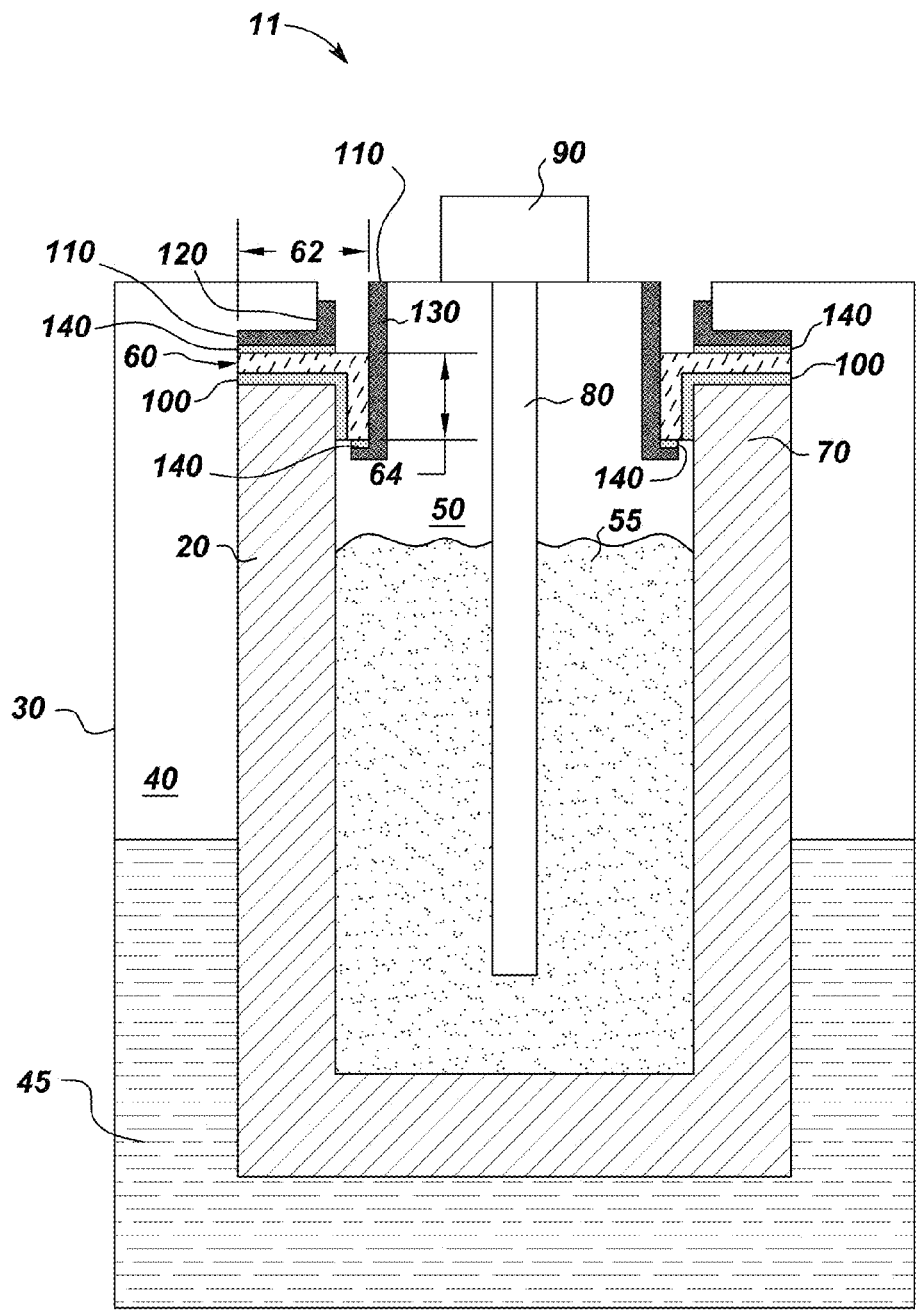
FIG. 1 is a schematic view showing a cross-section of an electrochemical cell that can be manufactured according to some embodiments of this invention.

When introducing elements of various embodiments of the present invention, the articles "a," "an," "the," and "said" are intended to mean that there are one or more of the elements, unless otherwise indicated. The terms "comprising," "including," and "having" are intended to be inclusive, and mean that there may be additional elements other than the listed elements. As used herein, the term "and/or" includes any and all combinations of one or more of the associated listed items. Unless otherwise indicated herein, the terms "disposed on", "deposited on" or "disposed between" refer to both direct contact between layers, objects, and the like, or indirect contact, e.g., having intervening layers therebetween.

Approximating language, as used herein throughout the specification and claims, may be applied to modify any quantitative representation that could permissibly vary, without resulting in a change in the basic function to which it may be related. Accordingly, a value modified by a term such as "about" is not limited to the precise value specified. In some instances, the approximating language may correspond to the precision of an instrument for measuring the value.

A brief description of some of the terms used in this disclosure would be helpful. As used herein, the term "liquidus temperature" generally refers to a temperature at which an alloy is transformed from a solid into a molten or viscous state. The liquidus temperature specifies the maximum temperature at which crystals can co-exist with the melt in thermodynamic equilibrium. Above the liquidus temperature, the alloy is homogeneous, and below the liquidus temperature, an increasing number of crystals begin to form in the melt with time, depending on the particular alloy. Generally, an alloy, at its liquidus temperature, melts and forms a seal between two components to be joined.

The liquidus temperature can be contrasted with a "solidus temperature". The solidus temperature quantifies the point at which a material completely solidifies (crystallizes). The liquidus and solidus temperatures do not necessarily align or overlap. If a gap exists between the liquidus and solidus temperatures, then within that gap, the material consists of solid and liquid phases simultaneously (like a "slurry").

"Sealing" is a function performed by a structure that joins other structures together, to reduce or prevent leakage through the joint between the other structures. The seal structure (e.g., various collar and ring structures as exemplified herein) may also be referred to as a "seal" or "joint" herein, for the sake of simplicity.

Typically, "brazing" uses a braze material (usually an alloy) having a lower liquidus temperature than the melting points of the components (i.e. their materials) to be joined. The braze material is brought slightly above its melting (or liquidus) temperature while protected by a suitable atmosphere. The braze material then flows over the components (known as wetting), and is then cooled to join the components together.

As used herein, "braze alloy composition" or "braze alloy", "braze material" or "brazing alloy", refers to a composition that has the ability to wet the components to be joined, and to seal them. A braze alloy, for a particular application, should withstand the service conditions required, and should melt at a lower temperature than the base materials; or should melt at a very specific temperature. Conventional braze alloys usually do not wet ceramic surfaces sufficiently to form a strong bond at the interface of a joint. In addition, the alloys may be prone to sodium and halide corrosion, when these types of materials are present within a structure to be brazed.

As used herein, the term "brazing temperature" refers to a temperature to which a brazing structure is heated to enable a braze alloy to wet the components to be joined, and to form a braze joint or seal. The brazing temperature is often higher than or equal to the liquidus temperature of the braze alloy. In addition, the brazing temperature should be lower than the temperature at which the components to be joined may become chemically, compositionally, and mechanically unstable. There may be several other factors that influence the brazing temperature selection, as those skilled in the art understand.

As further described herein, embodiments of the invention are directed to various energy storage devices that include sealing systems in which device components must be hermetically sealed to each other. The sodium-based battery cells that benefit greatly from these inventive concepts are known in the art, and are usually of the sodium metal halide- or sodium-sulfur type. Many details regarding some of these types of devices are provided, for example, in U.S. patent application Ser. No. 13/407,870, filed Feb. 29, 2012; Ser. No. 13/538,203, filed Jun. 29, 2012; Ser. No. 13/600,333, filed Aug. 31, 2012; and Ser. No. 13/628,548, filed Sep. 27, 2012; as well as U.S. Pat. No. 8,757,471, all of which are expressly incorporated herein by reference, in their entirety.

FIG. 1 is a schematic diagram depicting an exemplary embodiment of a sodium-metal halide battery cell 11. The cell 11 has an ion-conductive separator tube 20 disposed in a cell case 30 (usually the outer structure of the cell). The separator tube 20 is usually made of beta (β) alumina, and preferably, beta"-alumina (beta double prime alumina). The tube 20 defines an anodic chamber 40 between the cell case 30 and the tube 20, and a cathodic chamber 50, inside the tube 20. The anodic chamber 40 is usually filled with an anodic material 45, e.g. sodium. The cathodic chamber 50 contains a cathode material 55 (e.g. nickel and sodium chloride), and a molten electrolyte, usually sodium chloroaluminate ($NaAlCl_4$), along with some other additives.

An electrically insulating collar 60, which may be made of alpha-alumina or spinel, is situated at a top end 70 of the tube 20. A cathode current collector assembly 80 is often disposed in the cathode chamber 50, with a cap structure 90, in the top region of the cell. In this exemplary embodiment, the collar 60 is fitted onto the top end 70 of the separator tube 20, and is sealed by a glass seal 100 in an existing battery design. In one embodiment, the collar 60 includes an upper portion 62, and a lower inner portion 64 that abuts against an inner wall of the tube 20 through glass seal 100, as illustrated in FIG. 1.

In order to seal the cell 11 at the top end (i.e., its upper region), and to ensure that the anode and cathode are chemically and physically separate from each other, and separated from the collar 60 in the corrosive environment, at least one ring is employed. Thus, ring 110, made of metal or a metal alloy, is disposed, covering the collar 60, and joining the collar with the current collector assembly 80 (extending upwardly and outwardly), at the cap structure 90. The ring 110 often has two portions; an outer ring 120 and an inner ring 130, which are joined, respectively, with the upper portion 62 and the lower portion 64 of the collar 60, by means of the active braze seal 140. The outer ring contacts at least a portion of the ceramic collar and an adjacent portion of the cell case, through the braze material described herein. The inner ring usually contacts at least a portion of the cathode current collector assembly and an adjacent portion of the collar. While the term "portions" is used above, in most embodiments, these are usually two separate rings which are not in contact with each other. The active braze seal 140 is provided by the braze alloy composition described below.

The outer ring 120 and the inner ring 130 are usually welded shut to seal the cell, after joining with the collar 60 is completed. The outer ring 120 can be welded to the cell case 30; and the inner ring 130 can be welded to the current collector assembly 80.

The shapes and size of the several components discussed above with reference to FIG. 1 are only illustrative for the understanding of the cell structure; and are not meant to limit the scope of the invention. The exact position of the seals and the joined components can vary to some degree. Moreover, each of the terms "collar" and "ring" is meant to comprise metal or ceramic parts of circular or polygonal shape, and in general, all shapes that are compatible with a particular cell design.

According to some key embodiments of the invention, the various metallic components in the device of FIG. 1 can be attached to adjacent ceramic components by a process that involves spray deposition steps using selected types of spray techniques. The present inventors discovered significant advantages in using these techniques, as compared to the prior art techniques alluded to previously. The deposition steps include the spray-application of material components/constituents of a braze alloy composition that is suitable for the components being joined.

The braze alloy compositions useful for the present invention are those capable of forming a joint by active brazing with one or more active braze materials. As alluded to previously, "active brazing" uses an active metal element that promotes wetting of a ceramic surface, enhancing the capability of providing a seal (e.g., a hermetic seal). "Sealing", as used herein, is a function performed by a structure that joins other structures together, to reduce or prevent leakage through the joint between the other structures. The seal structure may also be referred to as a "seal." An "active metal element", as used herein, refers to a reactive metal that has a higher affinity to the oxygen than to the metallic element, and thereby reacts with the ceramic. (A braze alloy composition containing an active metal element can also be referred to as an "active braze alloy").

The active metal element is thought to undergo a decomposition reaction with the ceramic, when the braze alloy is in a molten state, and leads to the formation of a thin reaction layer on the interface of the ceramic and the braze alloy. The thin reaction layer allows the braze alloy to wet the ceramic surface, resulting in the formation of a ceramic-metal joint/bond, which may also be referred to as an "active braze seal."

Thus, an active metal element is an essential constituent of a braze alloy for employing active brazing. A variety of suitable active metal elements may be used to form the active braze alloy. The selection of a suitable active metal element mainly depends on the chemical reaction with the ceramic (e.g., alpha-alumina of the collar) to form a uniform and continuous reaction layer, and the capability of the active metal element of forming an alloy with a base alloy (e.g., a nickel-germanium alloy).

An "active" element will react with the ceramic, forming a reaction layer between the ceramic and the molten braze that will reduce the interfacial energy to such a level that wetting of the ceramic takes place. In some preferred embodiments, the active metal element is titanium. Other suitable examples of the active metal element include, but are not limited to, zirconium, hafnium, and vanadium. A combination of two or more active metal elements may also be used.

The presence and the amount of the active metal may influence the thickness and the quality of the thin reactive layer, which contributes to the wettability or flowability of the braze alloy, and therefore, the bond strength of the resulting joint. The active metal element is generally present in small amounts suitable for improving the wetting of the ceramic surface, and forming the thin reaction layer, for example, a layer of less than about 10 microns. A high amount of the active metal layer may cause or accelerate halide corrosion, in the case of halide-containing electrochemical cells, for example.

In some embodiments, the braze alloy composition includes nickel, at least one of the active metal elements mentioned above; and also comprises a) germanium, b) niobium and/or chromium, or c) silicon and/or boron. In those instances, the braze composition is often "nickel-based", i.e., containing about 30% or more nickel, by weight, and in some instances, containing at least about 50% nickel. These braze compositions may further include other alloying elements, such as cobalt and iron. Alternatively, the braze alloy composition may comprise copper, nickel, and an active metal element. Each of the elements of the alloy contributes to at least one property of the overall braze composition, such as liquidus temperature, coefficient of thermal expansion, flowability or wettability of the braze alloy with a ceramic; and corrosion resistance.

As mentioned above, a cold spray technique is used to apply an initial layer of an active metal (or combinations of active metals) to one or both of the surfaces being joined. Cold spray techniques are known in the art, and described in various references, such as "Current Trends in Cold Spray Technology: Looking at the Future"; Julio Villafuerte, Centerline Windsor, Ltd., Jan. 8, 2010 (www.metalfinishing.com), incorporated herein by reference. Other references include U.S. Patent Publications 2013/0177437 (Amancherla et al), published Jul. 11, 2013; and 2013/0153089 (Ajdelsztajn et al), published Jun. 20, 2013; and pending U.S. application Ser. No. 14/087,897 (R. Bunker et al), filed Nov. 22, 2013, all of which are incorporated herein by reference. In very general terms, "cold spray" is a solid-state coating process, i.e., the particles do not melt during the process. Cold spraying uses a high-speed gas jet to accelerate the metallic powder particles toward a substrate, whereby the particles plastically deform and consolidate upon impact.

As described by Ajdelsztajn et al (noted above), typical cold spray techniques employ a spray gun that receives a high pressure gas, such as helium, nitrogen, or air, along with a feedstock of deposit material, e.g., metals, alloys, or composite materials, in powder form. The powder granules are introduced at a high pressure into a gas stream in the spray gun, and emitted from an appropriate nozzle. The particles are accelerated to a high velocity in the gas stream. They may in fact reach a supersonic velocity. The gas stream may be heated. Typically, the gases are heated to less than the melting point of the particles, so as to minimize in-flight oxidation and phase changes in the deposited material. In some embodiments, the carrier gas is maintained at a temperature in the range of about 20° C. to about 1200° C. Moreover, in some preferred embodiments for the present invention, cold spraying is carried out in a helium atmosphere, in view of helium's high compressibility, relatively low atomic weight, and capabilities for high sonic velocities. The use of helium, partially diluted with nitrogen gas, is also possible.

FIG. 2 is a view of an exemplary cold spraying system 150, for depositing a powder coating material onto a surface 152 of a substrate 154. Feature 152 can represent the surface of a ceramic component, as described previously. The system 150 includes a spray gun 156, typically equipped with a converging/diverging nozzle 158, through which the powdered coating material is sprayed onto the surface. The substrate 154 may be formed from any suitable material known in the art, as described previously. During the coating process, the substrate 154 (and the surrounding cell structure) may be held stationary, or may be articulated, rotated, or translated by any suitable means (not shown) known in the art. The entire system is usually controlled by at least one robotic/computer device.

With continued reference to FIG. 2, the powder coating material is fed into the spray gun 156, via any suitable powder inlet 160. In some specific embodiments, the particles of the powdered coating materials are accelerated to supersonic velocities, using compressed gas. The gas can be fed to the spray gun 156 via gas inlet 162. The gas forces the powder onto the substrate at speeds that are typically in a range of between about 400 meters per second (m/s) and about 1500 m/s. As alluded to previously, the high-speed delivery causes the powder to adhere to the substrate surface, and to form a hard layer thereon. It should be understood that delivery speeds can vary to levels below about 800 m/s and above about 1500 m/s, and more preferably, between about 800 m/s and 1200 m/s, depending on the desired adhesion characteristics and powder type.

The spray gun 156 can further include a sensor receiver 164 for supporting temperature and/or pressure sensors configured to monitor parameters of the process gas. When applying the powdered coating materials to form the layer(s) on the substrate surface, the spray gun nozzle 158 can be held at a selected distance from the surface 152, known as the standoff distance. In one embodiment, the standoff distance is about 10 millimeters (mm) to about 100 mm.

Generally, the cold spraying process parameters are adjusted to achieve a hard coating layer with a fine grained structure. A key advantage of using cold spray for this process is that, since the particles are maintained below their melting point, their characteristics are not affected by any "thermal history". Therefore, the microstructure of the coating layer is substantially identical to the microstructure of the original coating particles. As alluded to previously, the fine microstructure helps to ensure a higher strength deposit on the substrate surface.

It should also be understood that various types of cold spray processes are available in the art, and can be used and/or modified to carry out the present invention. The "Metalfinishing" reference listed above (J. Villafuerte), for example, describes both a high pressure and a low pressure type of cold spray. In the high-pressure technique, the coating powder is injected into the system at a location before the spray nozzle throat, from a high pressure gas supply. In the low-pressure technique, the powder is injected into the diverging section of the spray nozzle, from a low-pressure gas supply. Those skilled in the cold-spraying art will be familiar with details that allow either process to be used for the present invention, when reviewed in conjunction with the teachings herein.

As mentioned above, at least one initial layer of an active metal is applied to one or both of the ceramic and metal components, by way of the cold spray technique. In some cases, multiple layers may be applied, e.g., two or three separate layers or "sublayers" of the active metal. Usually, the initial layer is applied to the ceramic component (i.e., in preference to the metal component). Spray conditions will depend on some of the factors described previously, as well as the specific composition of the initial layer. The thickness of the initial layer is usually in the range of about 0.2 micron to about 20 microns, and more preferably, in the range of about 0.5 micron to about 5 microns. In the case of an alumina-metal structure within a sodium metal halide battery, it is usually important that the thickness of the active metal layer (or the cumulative thickness of multiple layers) be no greater than about 10 microns, as explained previously.

After deposition of the first layer, a second layer is applied by the cold spray technique. The second layer comprises the braze composition described previously, which is usually based on nickel—especially in the case of use with sodium metal halide batteries. Moreover, the layer can be applied in the form of multiple layers. Again, spray conditions will depend on the particular composition of the braze. In some preferred embodiments, the composition of the second layer (or the total composition of multiple, second layers) comprises at least about 30% by weight nickel.

The overall thickness of the braze layer/structure (i.e., the total of the initial layer or multiple layers and the subsequent/second layer or multiple layers) will also depend on various factors. They include the particular composition of the braze; the shape and size of the components being joined; and the type of active metal being used. Usually, the braze thickness, after cooling and solidification, is in the range of about 5 microns to about 100 microns. In preferred embodiments, especially in the case of sodium metal halide batteries, the thickness is in the range of about 10 microns to about 75 microns.

In some embodiments, the nickel-based braze composition can be applied in a sequential series of cold spray depositions, after the deposition of the initial layer of active metal. For example, each deposition in the sequence can be a deposition of one or more constituents of the braze composition. As a non-limiting example, after the spray-deposition of a titanium active metal layer, a layer of chromium could be applied, by the same cold spray deposition gun, or by a different gun. A layer of nickel could follow the deposition of the chromium layer, followed by the deposition of a layer of either silicon or boron, or a layer having a combination of the two elements.

FIG. 3 is a simple depiction of an illustrative sequence, wherein "L" represents each layer, in sequence, culminating in the thermal treatment associated with brazing. The thickness of each individual layer for this embodiment will depend in part on the desired, overall thickness of the braze composition; as well as cold spray operating parameters. The active metal layer thickness was noted above, and each successive layer will usually have a thickness in the range of about 0.5 micron to about 5 microns. An advantage in many embodiments is that no heat treatment is required between the deposition of any of the layers.

FIG. 4 is a simplified illustration of a joining process according to some embodiments of the invention. (The various structures in the figure are not necessarily illustrated to scale). Ceramic component 170, e.g., a collar for a sodium nickel halide battery cell, includes a surface 172. This surface is the location for joining the ceramic component to metal structure 174, e.g., formed of nickel. At least one initial layer 176 of an active metal is applied on surface 172 by a cold spray process, as described above. Following deposition of the active metal layer(s), at least one second layer 178 of a nickel-based braze composition is applied over the active metal layer, so as to form an overall braze composition/structure 180. (As alluded to previously, the braze composition could be sprayed on the metal surface, instead of, or in addition to, spraying it onto the ceramic surface, but deposition on the ceramic surface is usually preferred).

The ceramic component 170 can then be attached to nickel structure 174 (e.g., a sealing ring), at a desired location on the structure. As an example, the ceramic component could be positioned and attached to surface 182 of metal structure 174, by contacting the braze surface 184 with surface 182 of the metal component. The two components can temporarily be held in place with an assembly (e.g., a clamp), or by other techniques, until brazing is complete.

The specific details of the brazing step are known in the art. The joined ceramic-metal structure having the braze composition therebetween is heated to an appropriate brazing temperature, and the braze alloy melts and flows over the joining surfaces. The heating can be undertaken in a controlled atmosphere, such as ultra-high pure argon, hydrogen and argon, ultra-high pure helium; or in a vacuum. To achieve good flow and wetting of the braze alloy, the brazing structure is held at the brazing temperature for a selected period, e.g., a few minutes after melting of the braze alloy. This period may be referred to as the "brazing time". During the brazing process, a load can also be applied on the samples.

The brazing temperature and the brazing time may influence the quality of the active braze seal. The brazing temperature is generally less than the melting temperatures of the components to be joined, and higher than the liquidus temperature of the braze alloy. In one embodiment, the brazing temperature ranges from about 900° C. to about 1500° C., for a time period of about 1 minute to about 30 minutes. In a specific, non-limiting embodiment, the heating is carried out at the brazing temperature from about 1000° C. to about 1300° C., for about 5 minutes to about 15 minutes.

During brazing, the alloy melts, and the active metal element (e.g., titanium) present in the melt reacts with the ceramic to form a thin reaction layer at the interface of the ceramic surface and the braze alloy, as described previously. The thickness of the reaction layer may range from about 0.1 micron to about 2 microns, depending on the amount of the active metal element available to react with the ceramic, and depending on the surface properties of the ceramic component. In a typical sequence, the brazing structure is then subsequently cooled to room temperature; with a resulting, active braze seal between the two components. In some instances, rapid cooling of the brazing structure is permitted.

It should be apparent that some of the embodiments of the present invention advantageously provide braze alloys, which are compositionally stable, and chemically stable in the corrosive environment relative to known braze alloys, and are capable of forming an active braze seal for a ceramic-to-metal joint. These braze alloys have high sodium corrosion resistance, and halide corrosion resistance for many end uses. The formation of ceramic-to-metal seals for high temperature cells (as discussed above) by active brazing simplifies the overall cell-assembly process, and improves the reliability and performance of the cell. The use of the cold spray process for the present invention provides advantages to leverage a relatively inexpensive, simple, and rapid process to seal the cell or battery, as compared to currently available sealing methods.

Some alternative embodiments are also within the scope of this invention. For example, in some cases, the entire braze alloy composition, including the active metal and other braze constituents, can be cold-sprayed at one time onto one of the mating surfaces, e.g., the ceramic surface. Appropriate adjustments in spray conditions can be made to accommodate the overall composition, which can be applied as one layer, or in multiple layers of the same composition.

Moreover, the metallic component for embodiments of this invention can comprise a wide variety of metals and alloys. Non-limiting examples in addition to nickel and the other metals mentioned above include niobium, molybdenum, a nickel-cobalt ferrous alloy; mild steel, stainless steel, tungsten, and various combinations of any of the foregoing.

The cold spray techniques are especially advantageous for the present invention. However, as an alternative, various thermal spray techniques can be used in some circumstances to deposit the braze compositions in one or more layers. Combustion spray techniques or plasma spray techniques could be used. Examples of the combustion spray techniques include high velocity oxygen fuel spraying (HVOF) or high velocity air fuel spraying (HVAF). Examples of the plasma techniques include low pressure plasma spraying, vacuum plasma spraying (VPS), or air plasma spraying (APS). Those skilled in the art will be able to select the most appropriate spray parameters for each type of spray process, depending on many of the factors discussed herein.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed:

1. A method for joining a ceramic component to a metallic component, comprising the following steps:
   a) applying at least one initial layer of an active metal onto one of the joining surfaces by a cold spray technique; wherein the active metal is a constituent for a nickel-based braze composition;
   b) applying additional constituents of the nickel-based braze composition over the initial layer by a sequential series of cold spray depositions, comprising a deposition of chromium, a deposition of nickel, and a deposition of at least one of silicon or boron; and c) heating the braze composition and components to a sufficient brazing temperature, so as to provide an active braze joint between them.

2. The method of claim 1, wherein each cold spray application is carried out a temperature that is less than the melting point of the composition being sprayed.

3. The method of claim 2, wherein each cold spray application is carried out in an atmosphere comprising air, nitrogen, or helium.

4. The method of claim 2, wherein each cold spray application is carried out in helium.

5. The method of claim 1, wherein the thickness of the active metal layer is in the range of about 0.2 micron to about 20 microns.

6. The method of claim 1, wherein the active metal is selected from the group consisting of titanium, zirconium, hafnium, and vanadium.

7. The method of claim 1, wherein the active metal is titanium.

8. The method of claim 1, wherein the braze composition further comprises at least one of iron or cobalt.

9. The method of claim 1, wherein the ceramic component is an alpha-alumina structure; and the metallic component is a structure comprising at least one of nickel, niobium, molybdenum, a nickel-cobalt ferrous alloy; mild steel, stainless steel, or tungsten, wherein both structures are incorporated into an electrochemical cell.

10. The method of claim 1, wherein the ceramic and metal components each comprise at least one thermal battery structure selected from the group consisting of electrode compartments; sealing collar structures, sealing ring structures, and electrical current collectors.

11. The method of claim 10, wherein the thermal battery is a sodium metal halide battery.

* * * * *